(12) United States Patent
Shibayama et al.

(10) Patent No.: US 8,035,814 B2
(45) Date of Patent: Oct. 11, 2011

(54) SPECTROSCOPY MODULE

(75) Inventors: Katsumi Shibayama, Hamamatsu (JP);
Tomofumi Suzuki, Hamamatsu (JP);
Masaki Hirose, Hamamatsu (JP)

(73) Assignee: Hamamatsu Photonics K.K.,
Hamamatsu-shi, Shizuoka (JP)

( * ) Notice: Subject to any disclaimer, the term of this patent is extended or adjusted under 35 U.S.C. 154(b) by 194 days.

(21) Appl. No.: 12/464,273

(22) Filed: May 12, 2009

(65) Prior Publication Data

US 2009/0290155 A1    Nov. 26, 2009

(30) Foreign Application Priority Data

May 15, 2008  (JP) ................. P2008-128687
Dec. 5, 2008  (JP) ................. P2008-311008

(51) Int. Cl.
*G01J 3/28* (2006.01)
(52) U.S. Cl. ........................................... 356/328
(58) Field of Classification Search .......... 356/326, 356/328
See application file for complete search history.

(56) References Cited

U.S. PATENT DOCUMENTS

| | | | |
|---|---|---|---|
| 4,644,632 A | 2/1987 | Mächler et al. | |
| 5,995,221 A | 11/1999 | Slutter et al. | |
| 6,081,331 A | 6/2000 | Teichmann | |
| 6,303,934 B1 | 10/2001 | Daly et al. | |
| 6,538,736 B1 * | 3/2003 | Palumbo | 356/326 |
| 6,859,274 B2 | 2/2005 | Inamoto | |
| 7,697,137 B2 * | 4/2010 | Comstock, II | 356/328 |
| 7,864,317 B2 | 1/2011 | Bockstaele et al. | |

(Continued)

FOREIGN PATENT DOCUMENTS

DE    197 17 015    10/1998

(Continued)

OTHER PUBLICATIONS

H.W. Teichmann, et al., "Replizierter Mikro-Optischer Sensor Fur Die Industrielle Spektralsensorik", tm-Technisches Messen, vol. 68, No. 5, May 2001, pp. 200-203 (with partial English-language translation).

(Continued)

*Primary Examiner* — Layla Lauchman
(74) *Attorney, Agent, or Firm* — Drinker Biddle & Reath LLP

(57) ABSTRACT

In a spectroscopy module 1, a light passing hole 50 through which a light L1 advancing to a spectroscopic portion 4 passes is formed in a light detecting element 5. Therefore, it is possible to prevent the relative positional relationship between the light passing hole 50 and a light detecting portion 5a of the light detecting element 5 from deviating. Moreover, the light detecting element 5 is bonded to a front plane 2a of a substrate 2 with an optical resin adhesive 63. Thus, it is possible to reduce a stress generated onto the light detecting element 5 due to a thermal expansion difference between the light detecting element 5 and the substrate 2. Additionally, on the light detecting element 5, a first convex portion 101 is formed so as to be located at least between the light detecting portion 5a and the light passing hole 50 when viewed from a direction substantially perpendicular to the front plane 2a. Thus, when the light detecting element 5 is attached to the substrate 2 via the optical resin adhesive 63, the optical resin adhesive 63 is dammed at the first convex portion 101. Thus, the optical resin adhesive 63 is prevented from penetrating into the light passing hole 50.

6 Claims, 8 Drawing Sheets

U.S. PATENT DOCUMENTS

| | | |
|---|---|---|
| 2002/0060792 A1 | 5/2002 | Ibsen et al. |
| 2003/0197862 A1 | 10/2003 | Cohen et al. |
| 2006/0268269 A1 | 11/2006 | Warren |
| 2008/0123095 A1 | 5/2008 | Hubner et al. |
| 2009/0284741 A1 | 11/2009 | Shibayama et al. |
| 2009/0284742 A1 | 11/2009 | Shibayama |
| 2009/0284743 A1 | 11/2009 | Shibayama |
| 2009/0290154 A1 | 11/2009 | Shibayama et al. |
| 2009/0290164 A1 | 11/2009 | Shibayama et al. |
| 2010/0214563 A1 | 8/2010 | Suzuki et al. |
| 2010/0238439 A1 | 9/2010 | Suzuki et al. |
| 2011/0075143 A1 | 3/2011 | Shibayama et al. |
| 2011/0116091 A1 | 5/2011 | Shibayama |

FOREIGN PATENT DOCUMENTS

| | | |
|---|---|---|
| FR | 2 847 978 | 6/2004 |
| JP | 4-287001 | 10/1992 |
| JP | 4-294223 | 10/1992 |
| JP | 6-167637 | 6/1994 |
| JP | 08-145794 | 6/1996 |
| JP | 2592081 | 3/1999 |
| JP | 2000-65642 | 3/2000 |
| JP | 2000-298066 | 10/2000 |
| JP | 2003-139611 | 5/2003 |
| JP | 2003-243444 | 8/2003 |
| JP | 2004-191246 | 7/2004 |
| JP | 2004-309146 | 11/2004 |
| JP | 2004-354176 | 12/2004 |
| JP | 2007-199540 | 8/2007 |
| WO | 2008/029852 | 3/2008 |
| WO | 2008/149939 | 12/2008 |
| WO | 2008/149940 | 12/2008 |
| WO | 2008/149944 | 12/2008 |

OTHER PUBLICATIONS

U.S. Appl. No. 12/992,398, filed Feb. 10, 2011, Shibayama.
U.S. Appl. No. 12/992,428, filed Feb. 23, 2011, Shibayama..
U.S. Appl. No. 12/992,412, filed Feb. 28, 2011, Shibayama.
U.S. Appl. No. 12/992,469, filed Feb. 8, 2011, Shibayama.

* cited by examiner

Fig.7
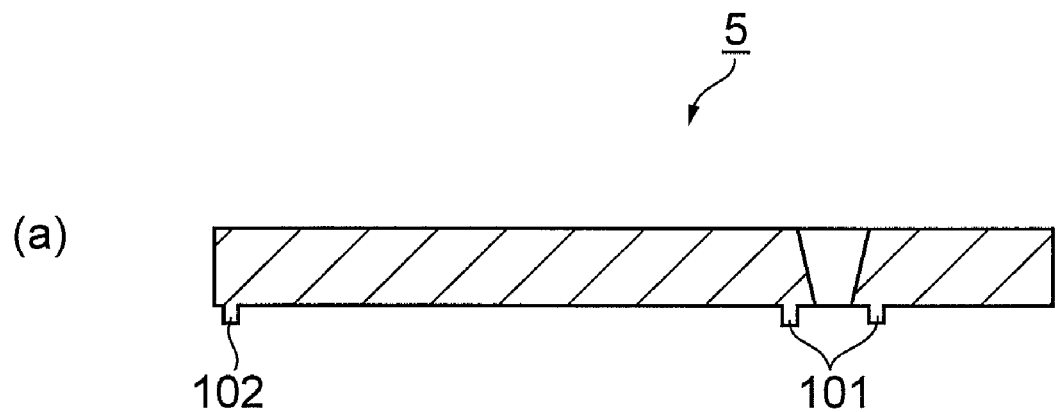
(a)
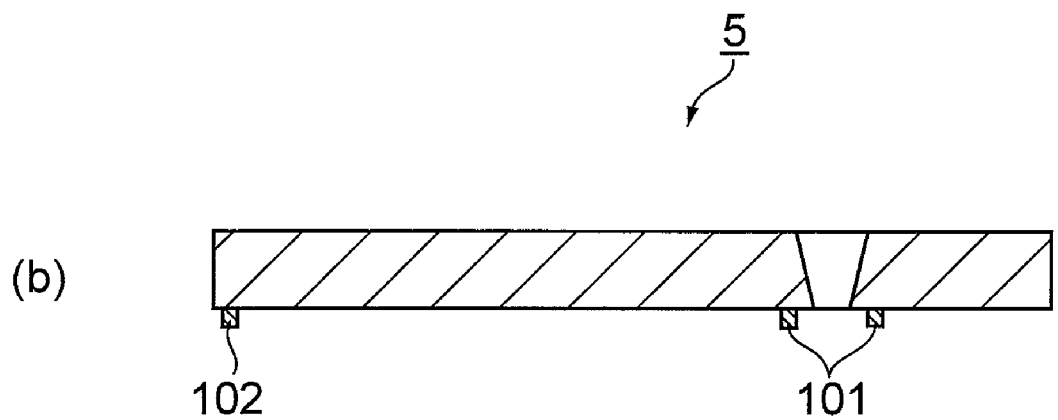
(b)

Fig.8
(a)
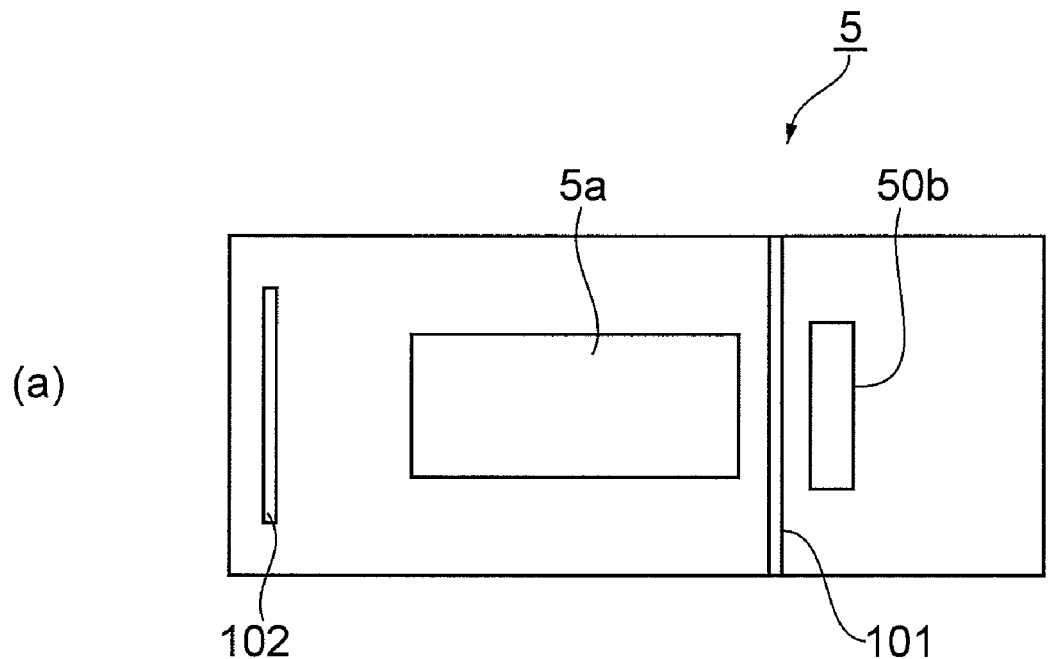
(b)
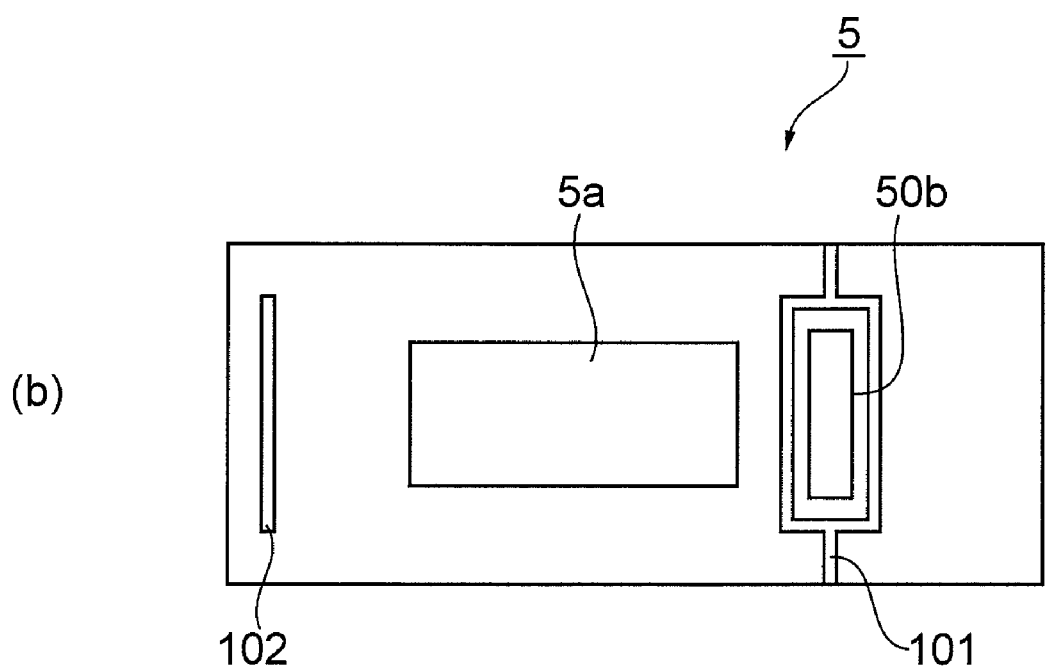

SPECTROSCOPY MODULE

BACKGROUND OF THE INVENTION

1. Field of the Invention

The present invention relates to a spectroscopy module for dispersing light to detect the light.

2. Related Background of the Invention

There is known such a conventional spectroscopy module described in, for example, Japanese Published Unexamined Patent Application No. H04-294223, Japanese Published Unexamined Patent Application No. 2004-354176, and Japanese Published Unexamined Patent Application No. 2003-243444. Japanese Published Unexamined Patent Application No. H04-294223 has described a spectroscopy module which is provided with a supporting body through which light is allowed to transmit, an incident slit portion through which light is made incident into the supporting body, a concave diffraction grating that disperses the light made incident into the supporting body to reflect the light, and a diode that detects the lights dispersed and reflected by the concave diffraction grating.

SUMMARY OF THE INVENTION

However, in the spectroscopy module described in Japanese Published Unexamined Patent Application No. H04-294223, when the incident slit portion and the diode are attached to the supporting body, the relative positional relationship between the incident slit portion and the diode may deviate, thereby degrading the reliability of the spectroscopy module.

The present invention has been achieved in consideration of the above-described circumstances, and an object of the present invention is to provide a highly reliable spectroscopy module.

In order to achieve the above-described object, the spectroscopy module according to the present invention is provided with a body portion through which light is allowed to transmit, a spectroscopic portion that disperses a light made incident into the body portion from a side of a predetermined plane of the body portion, to reflect lights to the side of the predetermined plane, a light detecting element which is provided on the predetermined plane, and detects the lights dispersed by the spectroscopic portion, and an optical resin adhesive disposed at least between the predetermined plane and a light detecting portion of the light detecting element, and in the spectroscopy module, a light passing hole through which a light advancing to the spectroscopic portion passes is formed, and terminal electrodes facing a side opposite to the body portion are provided in the light detecting element, and on a plane at the body portion side of the light detecting element, a first convex portion is formed so as to be located at least between the light detecting portion and the light passing hole when viewed from a direction substantially perpendicular to the predetermined plane.

In the spectroscopy module, the light passing hole through which a light advancing to the spectroscopic portion passes is formed is formed in the light detecting element. Therefore, it is possible to prevent the relative positional relationship between the light passing hole and the light detecting portion of the light detecting element from deviating. Moreover, the light detecting element is attached to the predetermined plane of the body portion via the optical resin adhesive. Thus, it is possible to reduce a stress generated onto the light detecting element due to a thermal expansion difference between the light detecting element and the body portion. Additionally, on the plane at the body portion side of the light detecting element, the first convex portion is formed so as to be located at least between the light detecting portion and the light passing hole when viewed from a direction substantially perpendicular to the predetermined plane. Thus, when the light detecting element is attached to the body portion via the optical resin adhesive, the optical resin adhesive is dammed at the first convex portion. Therefore, the optical resin adhesive is prevented from penetrating into the light passing hole. Thus, a light made incident into the body portion is prevented from being refracted or diffused by the optical resin adhesive penetrating into the light passing hole. Therefore, according to the spectroscopy module, it is possible to improve the reliability.

In the spectroscopy module according to the present invention, a light absorbing layer having a first light passing portion through which the light advancing to the spectroscopic portion passes, and a second light passing portion through which the lights advancing to the light detecting portion of the light detecting element pass, is preferably formed on the predetermined plane. In this case, because stray light is prevented from being generated and stray light is absorbed by the light absorbing layer, it is possible to prevent stray light from being made incident into the light detecting portion of the light detecting element.

In the spectroscopy module according to the present invention, the first convex portion is preferably formed into an annular shape so as to surround a light emitting opening of the light passing hole. In this case, when the light detecting element is attached to the body portion via the optical resin adhesive, the optical resin adhesive is dammed by the first convex portion over the entire circumference of the light emitting opening. Therefore, the optical resin adhesive is further prevented from penetrating into the light passing hole.

In the spectroscopy module according to the present invention, the first convex portion is preferably formed into an annular shape so as to surround the first light passing portion when viewed from a direction substantially perpendicular to the predetermined plane. In this case, when the light detecting element is attached to the body portion via the optical resin adhesive, the optical resin adhesive is dammed at the first convex portion. Thus, the optical resin adhesive is prevented from penetrating into the first light passing portion of the light absorbing layer. Therefore, a light made incident into the body portion is prevented from being refracted or diffused by the optical resin adhesive penetrating into the first light passing portion.

In the spectroscopy module according to the present invention, on a plane at the body portion side of the light detecting element, a second convex portion is preferably formed so as to be located at a side opposite to the first convex portion across the light detecting portion when viewed from a direction substantially perpendicular to the predetermined plane. In this case, when the light detecting element is attached to the body portion via the optical resin adhesive, it is possible to prevent the optical resin adhesive from flowing out of an end at the side at which the second convex portion is formed in the light detecting element.

The spectroscopy module according to the present invention is preferably further provided with a wiring board attached to the predetermined plane, and in the spectroscopy module, an opening portion into which the light detecting element is disposed is formed, and a wiring electrically connected to the terminal electrodes is provided in the wiring board. According to this configuration, it is possible to block a light that is trying to advance to the spectroscopic portion without passing through the light passing hole.

BRIEF DESCRIPTION OF THE DRAWINGS

FIG. 7 is an enlarged sectional view of a main part of the spectroscopy module of FIG. 1.

FIG. 8 is a plan view showing another embodiment of convex portions of the light detecting element in the spectroscopy module according to the present invention.

DESCRIPTION OF THE PREFERRED EMBODIMENTS

Figure 1:
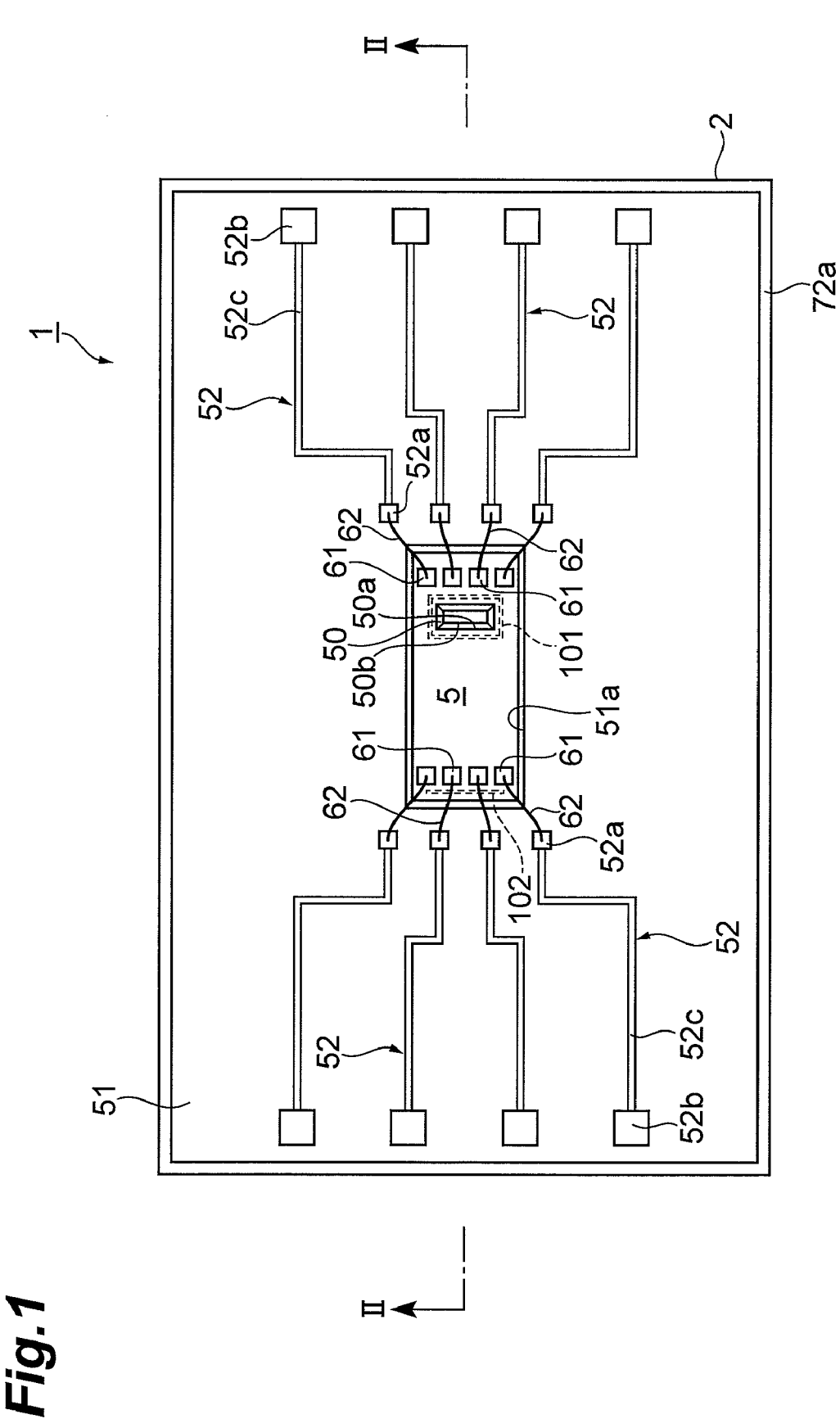
FIG. 1 is a plan view of a spectroscopy module as one embodiment according to the present invention.

Hereinafter, a detailed description will be given to preferred embodiments of the present invention by referring to the drawings. It is noted that in the individual drawings, the same reference letters or numerals are given to the same and corresponding parts, with overlapping description omitted.

Figure 2:
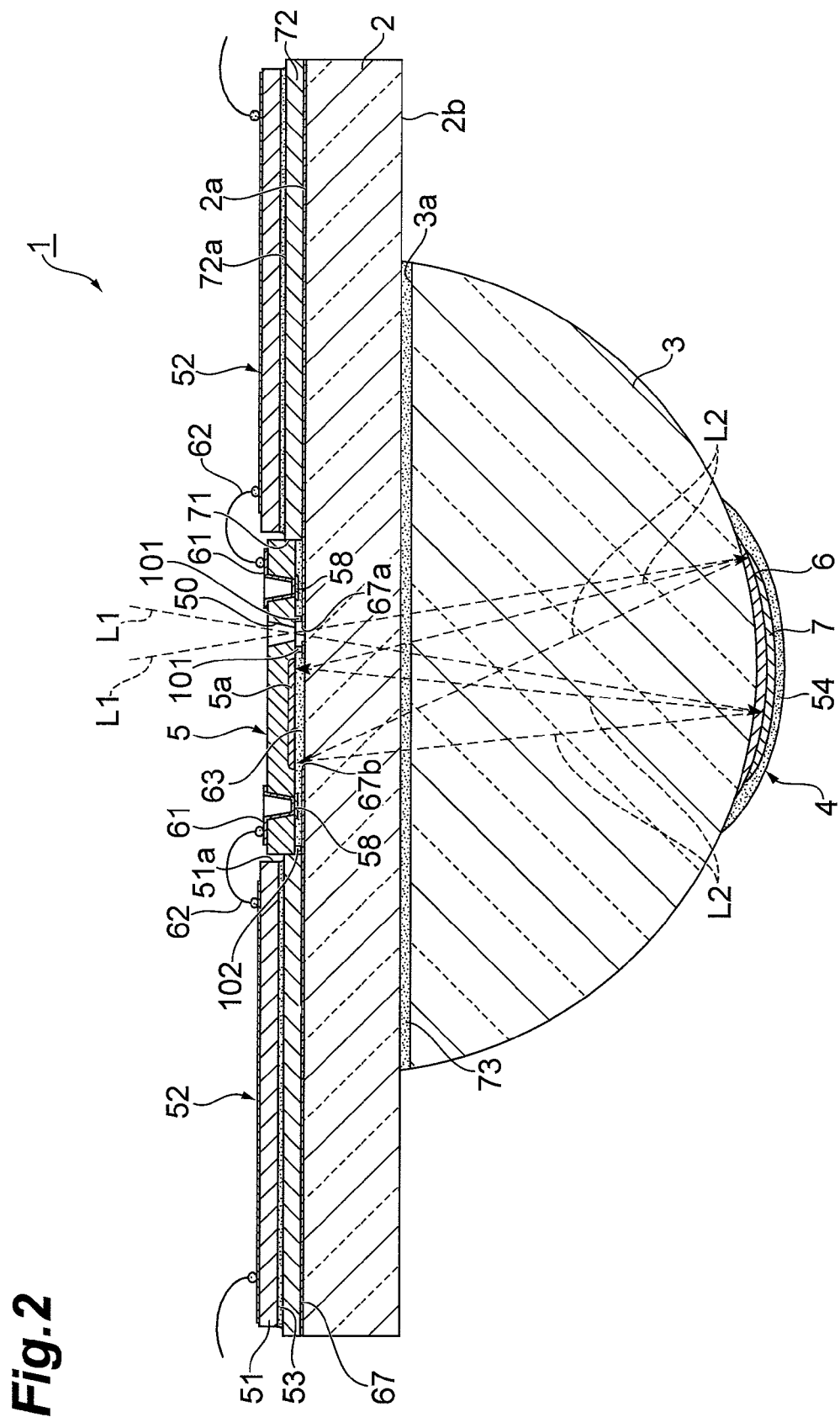
FIG. 2 is a cross sectional view taken along the line II to II shown in FIG. 1.

FIG. 1 is a plan view of a spectroscopy module as one embodiment according to the present invention, and FIG. 2 is a cross sectional view taken along the line II to II shown in FIG. 1. As shown in FIG. 1 and FIG. 2, a spectroscopy module 1 is provided with a substrate (body portion) 2 through which a light L1 made incident from a side of a front plane (predetermined plane) 2a is allowed to transmit, a lens portion (body portion) 3 through which the light L1 made incident into the substrate 2 is allowed to transmit, a spectroscopic portion 4 that disperses the light L1 made incident into the lens portion 3 to reflect the light toward the front plane 2a, and a light detecting element 5 that detects lights L2 dispersed by the spectroscopic portion 4. The spectroscopy module 1 is a micro-spectroscopy module that disperses the light L1 into the lights L2 corresponding to a plurality of wavelengths by the spectroscopic portion 4, and detects the lights L2 by the light detecting element 5, thereby measuring the wavelength distribution of the light L1, the intensity of a specific wavelength component, or the like.

The substrate 2 is formed into a rectangular plate shape (with, for example, an entire length of 15 to 20 mm, a full width of 11 to 12 mm, and a thickness of 1 to 3 mm), from light-transmitting glass such as BK7, Pyrex (registered trademark) and quartz, plastic, or the like. A resist layer 72 having an opening portion 71 in a cross-sectionally rectangular shape into which the light detecting element 5 is fitted, is formed on the front plane 2a of the substrate 2 via a light absorbing layer 67. A wiring board 51 in a rectangular plate shape, which has an opening portion 51a in a cross-sectionally rectangular shape in which the light detecting element 5 is disposed, is bonded to a front plane 72a of the resist layer 72 with a resin adhesive 53. A wiring 52 formed of a metal material is provided to the wiring board 51. The wiring 52 has a plurality of pad portions 52a disposed around the opening portion 51a, a plurality of pad portions 52b disposed at the both ends in the longitudinal direction of the wiring board 51, and a plurality of connection portions 52c that connect the pad portions 52a and the pad portions 52b which correspond to one another.

In addition, the light absorbing layer 67 formed on the front plane 2a of the substrate 2 has a light passing hole (a first light passing portion) 67a through which the light L1 advancing to the spectroscopic portion 4 passes via a light passing hole 50 (which will be described later) of the light detecting element 5, and a light passing hole (a second light passing portion) 67b through which the lights L2 advancing to a light detecting portion 5a (which will be described later) of the light detecting element 5 passes. As a material of the light absorbing layer 67, colored resin (silicon, epoxy, acrylic, urethane, polyimide, or composite resin, or the like) including black resist or a filler (such as carbon or oxide), metal such as Cr or Co or metal oxide thereof, or a laminated film thereof, or porous-type ceramic, metal, or metal oxide, can be cited.

Figure 3:
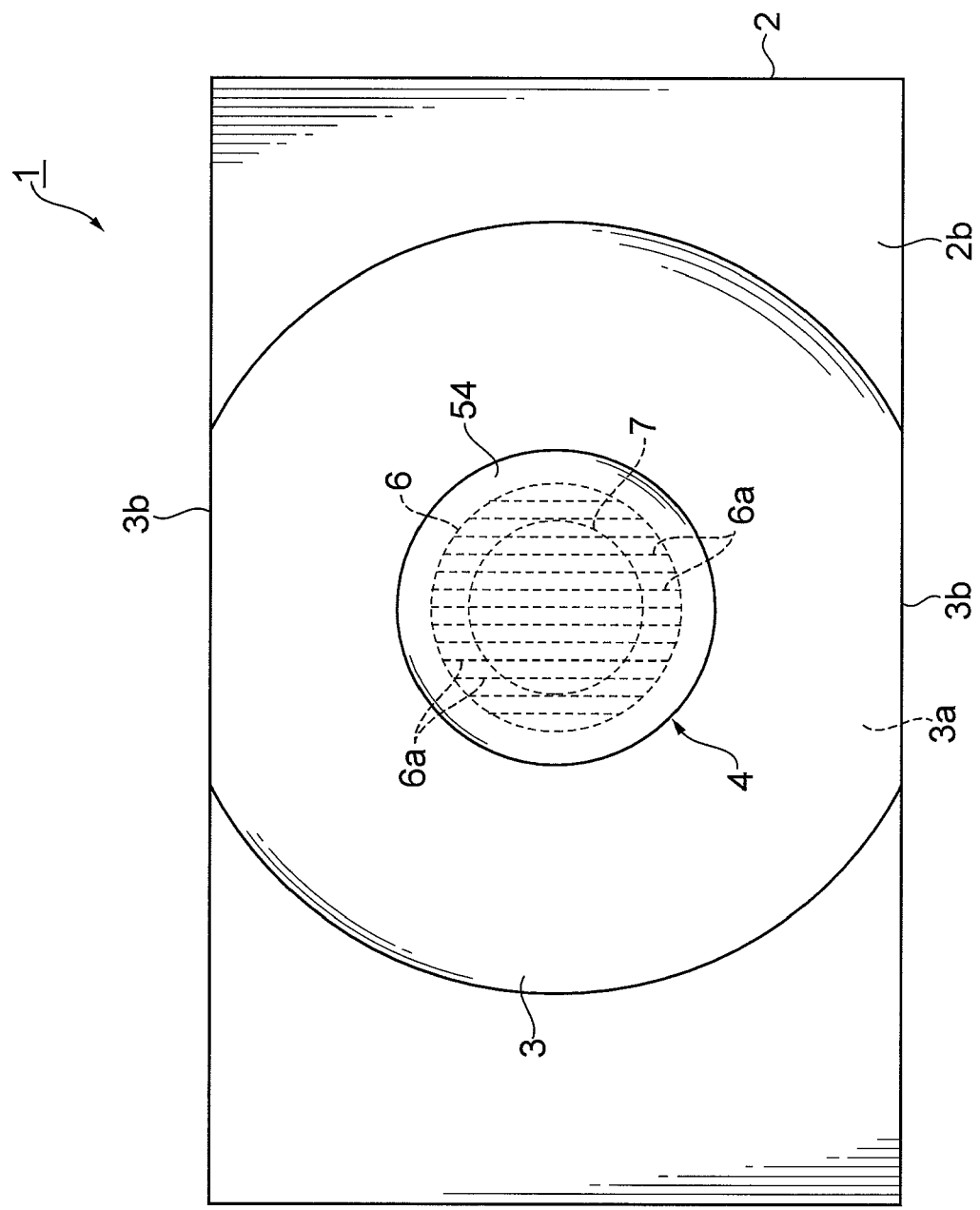
FIG. 3 is a bottom view of the spectroscopy module of FIG. 1.

FIG. 3 is a bottom view of the spectroscopy module of FIG. 1. As shown in FIGS. 2 and 3, the lens portion 3 is formed into a shape such that a semispherical lens is cut off along two planes substantially perpendicular to its bottom plane 3a and substantially parallel to each other to form its side planes 3b (with, for example, a curvature radius of 6 to 10 mm, an entire length of the bottom plane 3a of 12 to 18 mm, a full width of the bottom plane 3a (i.e., a distance between the side planes 3b) of 6 to 10 mm, and a height of 5 to 8 mm), from a material which is the same as that of the substrate 2, that is light-transmitting resin, a light-transmitting organic-inorganic hybrid material, or light-transmitting low-melting point glass or plastic, or the like. The lens portion 3 is bonded to a rear plane 2b of the substrate 2 with an optical resin adhesive 73 through which the lights L1 and L2 are allowed to transmit by using the outer edge portion of the substrate 2 such as the corners or the sides of the substrate 2 as a reference portion. At this time, because the spectroscopic portion 4 is positioned with respect to the lens portion 3 with high precision, the outer edge portion of the substrate 2 serves as a reference portion for positioning the spectroscopic portion 4 at the substrate 2. In addition, the lens shape is not limited to a spherical lens, and may be an aspherical lens.

The spectroscopic portion 4 is a reflection type grating having a diffraction layer 6 formed on the outer surface of the lens portion 3, a reflection layer 7 formed on the outer surface of the diffraction layer 6, and a passivation layer 54 that covers the diffraction layer 6 and the reflection layer 7. The diffraction layer 6 is formed so that a plurality of grating grooves 6a are provided adjacent to each other along the longitudinal direction of the substrate 2, and the direction in which the grating grooves 6a are extended is substantially matched to a direction substantially perpendicular to the longitudinal direction of the substrate 2. For example, a cross-sectionally serrated blazed grating, a cross-sectionally rectangular binary grating, a cross-sectionally sinusoidal holographic grating, or the like is applied as the diffraction layer 6, and the diffraction layer 6 is formed by subjecting optical resin for replica molding such as photo curing epoxy resin, acryl resin, or organic-inorganic hybrid resin to photo curing. The reflection layer 7 is a membrane form, and is formed by, for example, evaporating Al, Au, or the like onto the outer surface of the diffraction layer 6. In addition, an optical NA of the spectroscopy module can be adjusted by adjusting an area on which the reflection layer 7 is formed. The passivation layer 54 is a membrane form, and is formed by, for example, evaporating $MgF_2$, $SiO_2$, or the like onto the outer surfaces of the diffraction layer 6 and the reflection layer 7.

As shown in FIGS. 1 and 2, the light detecting element 5 is formed into a rectangular plate shape (with, for example, an entire length of 5 to 10 mm, a full width of 1.5 to 3 mm, and a thickness of 0.1 to 0.8 mm). The light detecting portion 5a is formed on the plane at the side of the spectroscopic portion 4 of the light detecting element 5. The light detecting portion 5a is a CCD image sensor, a PD array, or a CMOS image sensor or the like, and is formed such that a plurality of channels are arrayed in a direction substantially perpendicular to the direction in which the grating grooves 6a of the spectroscopic portion 4 are extended (i.e., the direction in which the grating grooves 6a are provided adjacent to each other).

In the case in which the light detecting portion 5a is a CCD image sensor, light intensity information at a position at which the light is made incident into pixels disposed two-dimensionally is subjected to line-binning, and to make the information into light intensity information at a one-dimensional position, the light intensity information at the one-dimensional position is read out in time-series. That is, a line of the pixels subjected to line-binning becomes one channel. In the case in which the light detecting portion 5a is a PD array or a CMOS image sensor, because light intensity information at a position at which the light is made incident into pixels disposed one-dimensionally is read out in time-series, one pixel becomes one channel.

In addition, in the case in which the light detecting portion 5a is a PD array or a CMOS image sensor, and pixels are arrayed two-dimensionally, a line of pixels arrayed in a direction of a one-dimensional array parallel to the direction in which the grating grooves 6a of the spectroscopic portion 4 are extended becomes one channel. Further, in the case in which the light detecting portion 5a is a CCD image sensor, for example, a light detecting portion 5a in which a space between channels in its array direction is 12.5 μm, an entire length of a channel (a length of a one-dimensional pixel row subjected to line-binning) is 1 mm, and the number of channels to be arrayed is 256 is used for the light detecting element 5.

Further, the light passing hole 50 through which the light L1 advancing to the spectroscopic portion 4 passes, that is provided adjacent to the light detecting portion 5a in the array direction of the channels, is formed in the light detecting element 5. The light passing hole 50 is a slit (with, for example, a length of 0.5 to 1 mm and a width of 10 to 100 μm) which is extended in a direction substantially perpendicular to the longitudinal direction of the substrate 2, and is formed by etching or the like so as to be positioned with high precision with respect to the light detecting portion 5a.

Figure 4:
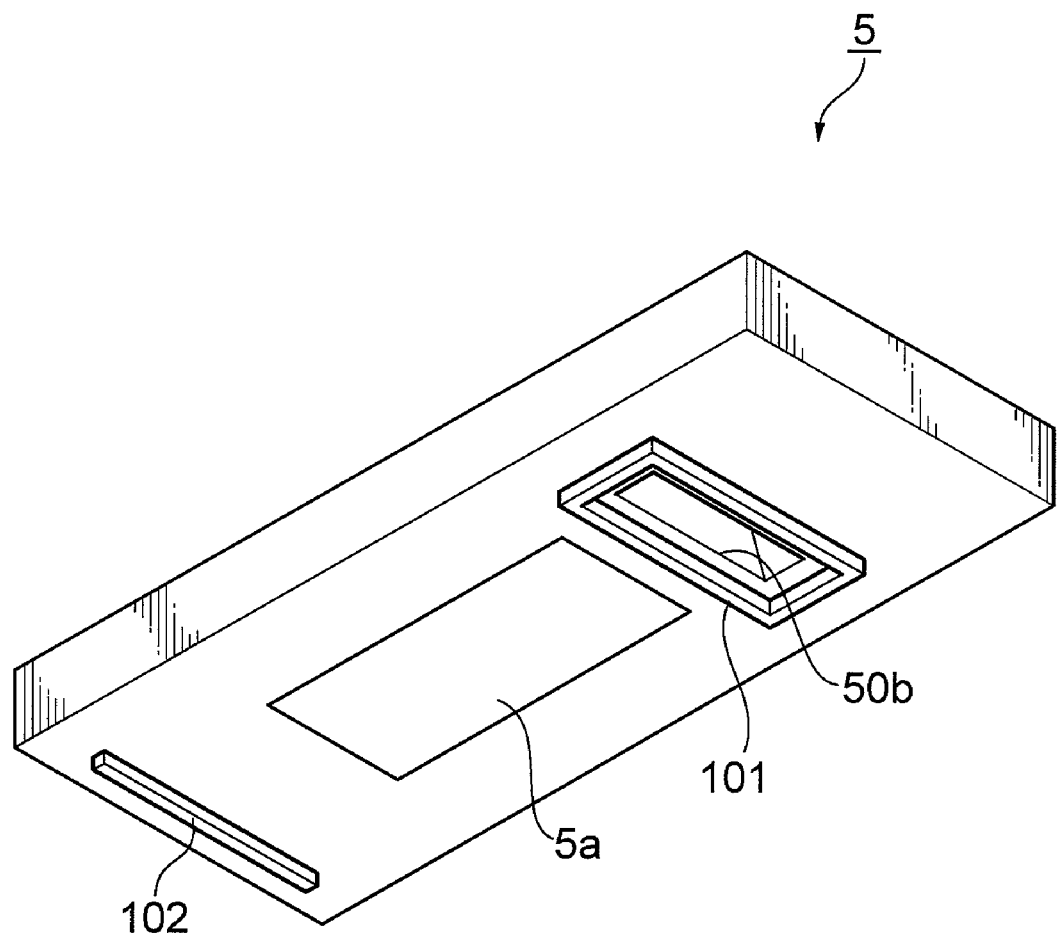
FIG. 4 is a perspective view of a light detecting element of the spectroscopy module of FIG. 1.
Figure 5:
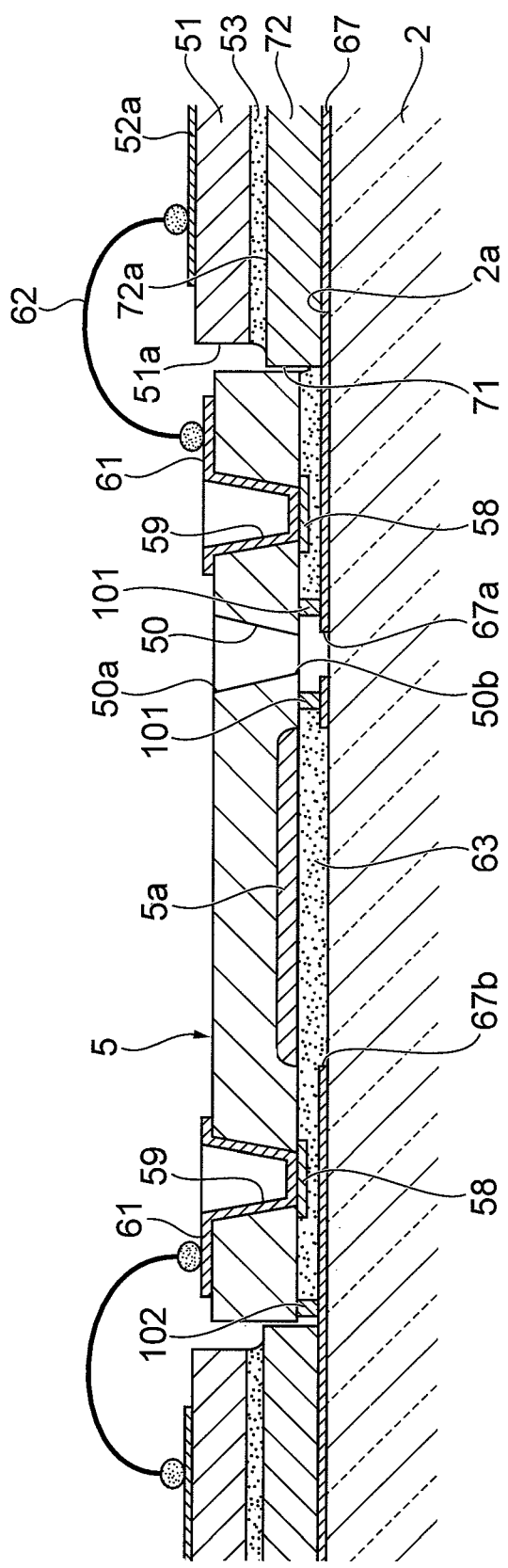
FIG. 5 is an enlarged sectional view of a main part of the spectroscopy module of FIG. 1.

FIG. 4 is a perspective view of the light detecting element of the spectroscopy module of FIG. 1. FIG. 5 is an enlarged sectional view of a main part of the spectroscopy module of FIG. 1. As shown in FIGS. 4 and 5, a first convex portion 101 is formed so as to surround a light emitting opening 50b in a plane at the side of the substrate 2 of the light detecting element 5. As shown in FIG. 4, the first convex portion 101 is formed into a rectangular annular shape. Further, the first convex portion 101 is formed so as to surround the light passing hole 67a when viewed from a direction substantially perpendicular to the front plane 2a of the substrate 2. Moreover, a second convex portion 102 is formed into a plane at the side of the substrate 2 of the light detecting element 5. The second convex portion 102 is formed so as to be located at the side opposite to the first convex portion 101 across the light detecting portion 5a when viewed from a direction substantially perpendicular to the front plane 2a of the substrate 2. In this case, the second convex portion 102 is formed into a linear shape.

As shown in FIGS. 1 and 5, a plurality of electrodes 58 are formed on the plane at the side of the substrate 2 of the light detecting element 5, and a plurality of terminal electrodes 61 connected to the respective electrodes 58 via feed-through electrodes 59 are formed on the plane opposite to the substrate 2 of the light detecting element 5. The respective terminal electrodes 61 facing the side opposite to the substrate 2 are connected to the corresponding pad portions 52a of the wiring board 51 with wires 62. Thereby, the terminal electrodes 61 and the wiring 52 are electrically connected, and electric signals generated in the light detecting portion 5a are led to the outside via the electrodes 58, the feed-through electrodes 59, the terminal electrodes 61, the pad portions 52a, connection portions 52c, and the pad portions 52b.

As shown in FIG. 5, the light detecting element 5 is fitted into the opening portion 71 of the resist layer 72, and is bonded to the front plane 2a of the substrate 2 with an optical resin adhesive 63 through which the lights L1 and L2 are allowed to transmit. The opening portion 71 is formed by etching so as to have a predetermined positional relationship with respect to the outer edge portion of the substrate 2 serving as a reference portion for positioning the spectroscopic portion 4 to the substrate 2. In addition, the light detecting element 5 is projected from the front plane 72a of the resist layer 72 while being fitted into the opening portion 71.

In the spectroscope module 1 configured as described above, the light L1 is made incident into the substrate 2 from the side of the front plane 2a of the substrate 2 via the light passing hole 50 of the light detecting element 5 and the light passing hole 67a of the light absorbing layer 67, and advance inside the substrate 2, the optical resin adhesive 73, and the lens portion 3, to reach the spectroscopic portion 4. The light L1 reaching the spectroscopic portion 4 is dispersed into lights L2 corresponding to a plurality of wavelengths by the spectroscopic portion 4. The dispersed lights L2 are reflected toward the front plane 2a of the substrate 2, and advance inside the lens portion 3, the optical resin adhesive 73, and the substrate 2 to reach the light detecting portion 5a of the light detecting element 5 via the light passing hole 67b of the light absorbing layer 67 and the optical resin adhesive 63. The lights L2 reaching the light detecting portion 5a are detected by the light detecting element 5.

A method for manufacturing the spectroscopy module 1 described above will be described.

First, the spectroscopic portion 4 is formed on the lens portion 3. In detail, a light-transmitting master grating on which gratings corresponding to the diffraction layer 6 are engraved is pushed onto the optical resin for replica molding falling in drops near the tip of the lens portion 3. Then, the optical resin for replica molding is subjected to light in this state to cure the optical resin for replica molding, and the optical resin for replica molding is preferably subjected to thermal curing for stabilization, to form the diffraction layer 6 having the plurality of grating grooves 6a. Thereafter, the master grating is demolded, and Al, Au, or the like is evaporated with a mask or is entirely evaporated onto the outer surface of the diffraction layer 6 to form the reflection layer 7. Moreover, $MgF_2$, $SiO_2$, or the like is evaporated with a mask or is entirely evaporated onto the outer surfaces of the diffraction layer 6 and the reflection layer 7 to form the passivation layer 54.

Meanwhile, the substrate 2 is prepared, and the light absorbing layer 67 having the light passing holes 67a and 67b is formed on the front plane 2a of the substrate 2. Moreover, the resist layer 72 having the opening portion 71 is formed on the front plane 2a of the substrate 2 via the light absorbing layer 67. In addition, the opening portion 71 is formed by photo-etching so as to have a predetermined positional relationship with respect to the outer edge portion of the substrate 2 serving as a reference portion for positioning the spectroscopic portion 4 to the substrate 2.

Next, the optical resin adhesive 63 is applied onto the front plane 2a of the substrate 2 exposed in the opening portion 71 of the resist layer 72, and the light detecting element 5 in which the first convex portion 101 and the second convex portion 102 are formed is fitted into the opening portion 71, to be pressed onto the front plane 2a of the substrate 2. At this time, the optical resin adhesive is dammed at the first convex portion 101 and the second convex portion 102. Then, the optical resin adhesive 63 is subjected to light to be cured, and the light detecting element 5 is mounted onto the substrate 2. Thereafter, the wiring board 51 is bonded to the front plane 72a of the resist layer 72 with the resin adhesive 53. Then, the terminal electrodes 61 of the light detecting element 5 and the pad portions 52a of the wiring board 51 which correspond to one another are connected with the wires 62, to obtain the spectroscopy module 1.

Next, the lens portion 3 on which the spectroscopic portion 4 is formed is bonded to the rear plane 2b of the substrate 2 with the optical resin adhesive 73 by using the outer edge portion of the substrate 2 as a reference portion, to obtain the spectroscopy module 1.

As described above, in the spectroscopy module 1, the light passing hole 50 through which the light L1 advancing to the spectroscopic portion 4 passes, is formed in the light detecting element 5. Therefore, it is possible to prevent the relative positional relationship between the light passing hole 50 and the light detecting portion 5a of the light detecting element 5 from deviating. Moreover, the light detecting element 5 is bonded to the front plane 2a of the substrate 2 with the optical resin adhesive 63. Thus, it is possible to reduce a stress generated onto the light detecting element 5 due to a thermal expansion difference between the light detecting element 5 and the substrate 2. Additionally, on the plane at the side of the substrate 2 of the light detecting element 5, the first convex portion 101 is formed so as to be located between the light detecting portion 5a and the light passing hole 50 when viewed from a direction substantially perpendicular to the front plane 2a of the substrate 2. Thus, when the light detecting element 5 is attached to the substrate 2 via the optical resin adhesive 63, the optical resin adhesive 63 is dammed at the first convex portion 101. Therefore, the optical resin adhesive 63 is prevented from penetrating into the light passing hole 50. Therefore, a light made incident into the substrate 2 is prevented from being refracted or diffused by the optical resin adhesive penetrating into the light passing hole 50. Here, the first convex portion 101 is formed into an annular shape so as to surround the light emitting opening 50b. Therefore, when the light detecting element 5 is attached to the substrate 2 via the optical resin adhesive 63, the optical resin adhesive 63 is made to be dammed by the first convex portion over the entire circumference of the light emitting opening. Thus, the optical resin adhesive is further prevented from penetrating into the light passing hole. Additionally, the first convex portion 101 is formed so as to surround the light passing hole 67a when viewed from a direction substantially perpendicular to the front plane 2a of the substrate 2. Thus, when the light detecting element 5 is attached to the substrate 2 via the optical resin adhesive 63, the optical resin adhesive 63 is dammed at the first convex portion 101. Thus, the optical resin adhesive 63 is prevented from penetrating into the light passing hole 67a. Therefore, a light made incident into the substrate 2 is prevented from being refracted or diffused by the optical resin adhesive penetrating into the light passing hole 67a. Further, on the plane at the side of the substrate 2 of the light detecting element 5, the second convex portion 102 is formed so as to be located at the side opposite to the first convex portion 101 across the light detecting portion 5a when viewed from a direction perpendicular to the front plane 2a of the substrate 2. Thus, the optical resin adhesive 63 is prevented from leaking out of the end at the side at which the second convex portion 102 is formed in the light detecting element 5. Therefore, according to the spectroscopy module 1, it is possible to improve the reliability.

Further, in the spectroscopy module 1, the light absorbing layer 67 having the light passing hole 67a through which the light L1 advancing to the spectroscopic portion 4 passes and the light passing hole 67b through which the lights L2 advancing to the light detecting portion 5a of the light detecting element 5 passes, is formed on the front plane 2a of the substrate 2. Because the light absorbing layer 67 prevents generation of stray light and absorbs stray light, it is possible to prevent stray light from being made incident into the light detecting portion 5a.

Further, in the spectroscopy module 1, the wiring board 51 having the wiring 52 electrically connected to the terminal electrodes 61 of the light detecting element 5 is bonded to the front plane 2a of the substrate 2 in a state in which the light detecting element 5 is disposed in the opening portion 51a. According to the wiring board 51, it is possible to block a light that is trying to advance to the spectroscopic portion 4 without passing through the light passing hole 50.

Further, in the spectroscopy module 1, because the opening portion 71 of the resist layer 72 has a predetermined positional relationship with respect to the outer edge portion of the substrate 2 serving as a reference portion for positioning the spectroscopic portion 4 to the substrate 2, the light detecting element 5 is positioned to the substrate 2 by merely fitting the light detecting element 5 into the opening portion 71. At this time, because the lens portion 3 on which the spectroscopic portion 4 is formed is positioned to the substrate 2 in accordance with the outer edge portion of the substrate 2 serving as a reference portion, as a result, alignment of the spectroscopic portion 4 and the light detecting element 5 is achieved. Therefore, it is possible to simply assemble the module while maintaining the reliability.

Further, in the spectroscopy module 1, the light detecting element 5 is projected from the front plane 72a of the resist layer 72 while being fitted into the opening portion 71. Thereby, it is possible, not only to make a work of fitting the light detecting element 5 into the opening portion 71 provided in the front plane 72a of the resist layer 72 easy, but also to reliably allow excess resin or air out by reliably pressing the light detecting element 5 onto the front plane 2a of the substrate 2 exposed in the opening portion 71.

The present invention is not limited to the above-described embodiment.

Figure 6:
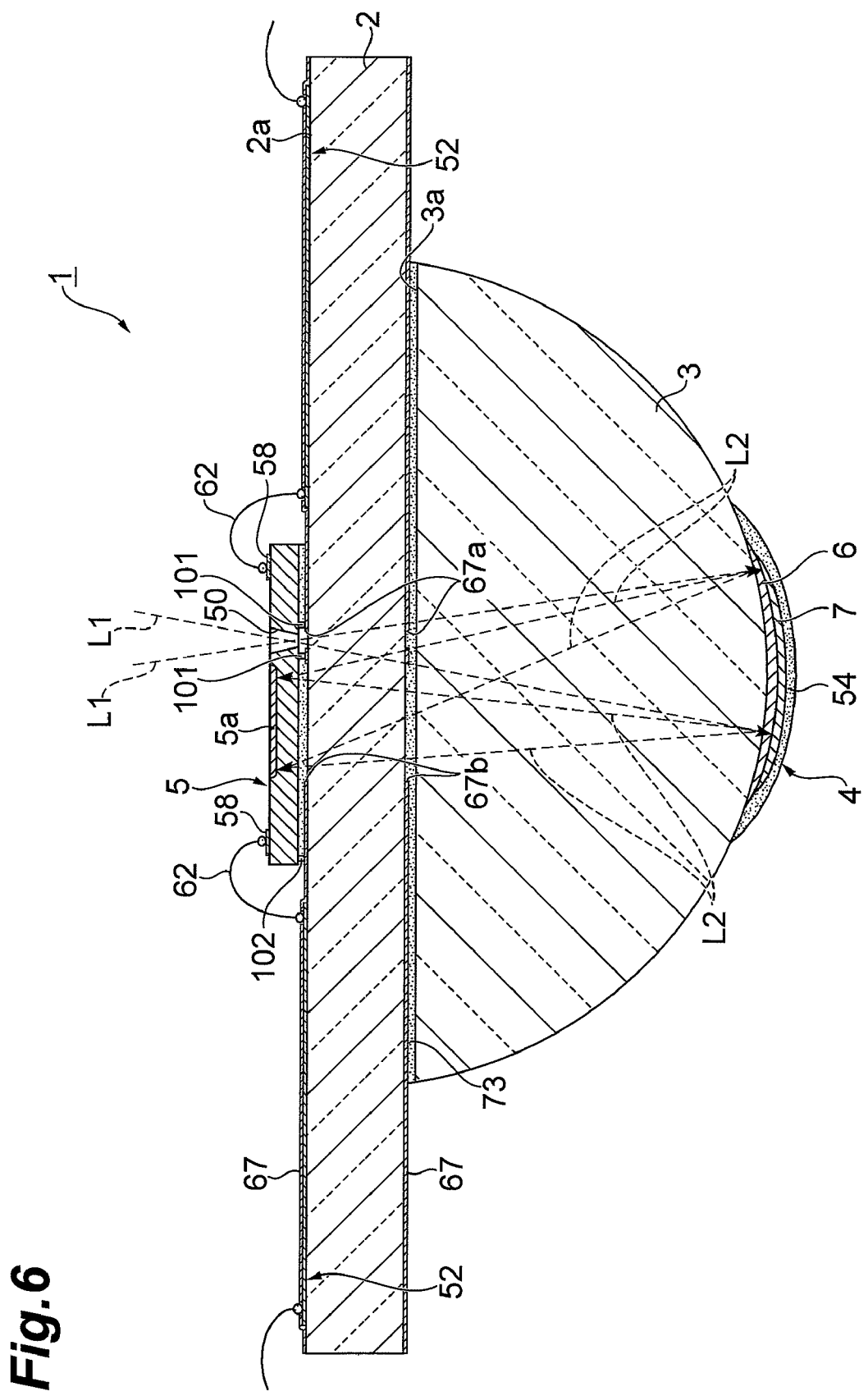
FIG. 6 is a cross sectional view of a spectroscopy module as another embodiment according to the present invention.

For example, as shown in FIG. 6, the light absorbing layer 67 having the light passing hole 67a through which the light L1 advancing to the spectroscopic portion 4 passes and the light passing hole 67b through which the lights L2 advancing to the light detecting portion 5a of the light detecting element 5 passes, may be formed between the substrate 2 and the lens portion 3. According to this configuration, it is possible for the light advancing while spreading to be limited so as to reach a desired area, and it is possible to effectively prevent stray light from being made incident into the light detecting element 5. Further, it is possible to adjust an optical NA by differing the sizes of the light passing holes 67a and 67b in the light absorbing layer 67.

Further, as shown in FIG. 6, a so-called back-illuminated type element may be applied as the light detecting element 5. In this case, because the electrodes 58 are located outside along with the light detecting portion 5a, the electrodes 58 may be used as terminal electrodes facing the side opposite to the substrate 2, and the electrodes 58 may be connected with the wiring 52 and the wires 62 provided to the front plane 2a of the substrate 2.

Further, it is not necessary to provide a portion into which the light detecting element 5 is fitted, to the substrate 2 by forming the resist layer 72 or the like. For example, as shown in FIG. 6, the module may be configured such that the light detecting element 5 is attached to the front plane 2a of the substrate 2 via the optical resin adhesive 63. Moreover, the substrate 2 and the lens portion 3 may be integrally formed with a mold, and the lens portion 3 and the diffraction layer 6 may be integrally formed of light-transmitting low-melting point glass for replica molding or the like.

Here, as shown in FIG. 7A, the light detecting element 5 may be subjected to an etching process to form the first convex portion 101 and the second convex portion 102 integrally with the light detecting element 5, or as shown in FIG. 7B, patterning may be applied to the light detecting element 5 with permanent resist, metal, or insulator, etc., to form the first convex portion 101 and the second convex portion 102 separately from the light detecting element 5.

Further, the first convex portion 101 is a rectangular annular shape in the present embodiment. However, the first convex portion 101 is not limited to the shape. For example, as shown in FIG. 8A, the first convex portion 101 may be formed into a linear shape so as to separate the light emitting opening 50b and the light detecting portion 5a when viewed from a direction substantially perpendicular to the front plane 2a of the substrate 2. Moreover, as shown in FIG. 8B, the first convex portion 101 may be formed so as to separate the light emitting opening 50b and the light detecting portion 5a, and surround the light emitting opening 50b when viewed from a direction substantially perpendicular to the front plane 2a of the substrate 2. Further, the shapes of the first convex portion 101 and the second convex portion 102 when viewed from a direction substantially perpendicular to the front plane 2a of the substrate 2 are not limited to linear shapes, and may be curved shapes. For example, the second convex portion 102 may be a laterally-facing U-shaped groove curved so as to surround the light emitting opening 50b. Moreover, the first convex portion 101 may be formed at least between the light detecting portion 5a and the light passing hole 50 when viewed from a direction substantially perpendicular to the front plane 2a of the substrate 2.

In accordance with the present invention, it is possible to improve the reliability of the spectroscopy module.

What is claimed is:

1. A spectroscopy module comprising:
   a body portion through which light is allowed to transmit;
   a spectroscopic portion that disperses a light made incident into the body portion from a side of a predetermined plane of the body portion, and reflects lights to the side of the predetermined plane;
   a light detecting element which is provided on the predetermined plane, the light detecting element detects the lights dispersed by the spectroscopic portion; and
   an optical resin adhesive disposed at least between the predetermined plane and a light detecting portion of the light detecting element, wherein,
   a light passing hole through which a light advancing to the spectroscopic portion passes is formed, and terminal electrodes facing a side opposite to the body portion are provided in the light detecting element, and
   on a plane at the body portion side of the light detecting element, a first convex portion is formed so as to be located at least between the light detecting portion and the light passing hole when viewed from a direction substantially perpendicular to the predetermined plane.

2. The spectroscopy module according to claim 1, wherein a light absorbing layer having a first light passing portion through which the light advancing to the spectroscopic portion passes, and a second light passing portion through which the lights advancing to the light detecting portion of the light detecting element pass, is formed on the predetermined plane.

3. The spectroscopy module according to claim 1, wherein the first convex portion is formed into an annular shape so as to surround a light emitting opening of the light passing hole.

4. The spectroscopy module according to claim 2, wherein the first convex portion is formed into an annular shape so as to surround the first light passing portion when viewed from a direction substantially perpendicular to the predetermined plane.

5. The spectroscopy module according to claim 1, wherein, on a plane at the body portion side of the light detecting element, a second convex portion is formed so as to be located at a side opposite to the first convex portion across the light detecting portion when viewed from a direction substantially perpendicular to the predetermined plane.

6. The spectroscopy module according to claim 1, further comprising a wiring board attached to the predetermined plane, wherein
   an opening portion into which the light detecting element is disposed is formed, and a wiring electrically connected to the terminal electrodes is provided in the wiring board.

* * * * *